(12) United States Patent
Reed et al.

(10) Patent No.: US 7,304,603 B2
(45) Date of Patent: Dec. 4, 2007

(54) RADAR APPARATUS AND PROCESSING METHOD FOR DETECTING HUMAN CARRIED EXPLOSIVE DEVICES

(75) Inventors: John C. Reed, Centreville, VA (US); John D. Gorman, Falls Church, VA (US)

(73) Assignee: Science, Engineering and Technology Associates Corporation, Arlington, VA (US)

( * ) Notice: Subject to any disclaimer, the term of this patent is extended or adjusted under 35 U.S.C. 154(b) by 169 days.

(21) Appl. No.: 11/356,997

(22) Filed: Feb. 17, 2006

(65) Prior Publication Data

US 2007/0194976 A1    Aug. 23, 2007

(51) Int. Cl.
*G01S 13/02* (2006.01)
*G01S 13/56* (2006.01)

(52) U.S. Cl. .......................... 342/188; 342/22; 342/27; 342/160

(58) Field of Classification Search ................ 342/188
See application file for complete search history.

(56) References Cited

U.S. PATENT DOCUMENTS

| | | | | |
|---|---|---|---|---|
| 5,334,981 | A * | 8/1994 | Smith et al. .................. | 342/27 |
| 5,530,447 | A | 6/1996 | Henderson et al. | |
| 6,243,036 | B1 * | 6/2001 | Chadwick et al. ............ | 342/27 |
| 6,777,684 | B1 * | 8/2004 | Volkov et al. ............ | 250/341.1 |
| 6,825,456 | B2 * | 11/2004 | Chadwick et al. .......... | 250/225 |
| 6,856,271 | B1 * | 2/2005 | Hausner ...................... | 342/22 |
| 6,967,612 | B1 * | 11/2005 | Gorman et al. ................ | 342/22 |
| 7,034,746 | B1 * | 4/2006 | McMakin et al. .......... | 342/179 |
| 7,167,123 | B2 * | 1/2007 | Hausner et al. ................ | 342/22 |
| 7,180,441 | B2 * | 2/2007 | Rowe et al. ................... | 342/22 |
| 7,205,926 | B2 * | 4/2007 | Rowe et al. ................... | 342/22 |
| 2003/0034444 | A1 * | 2/2003 | Chadwick et al. .......... | 250/225 |
| 2003/0163042 | A1 * | 8/2003 | Salmon ...................... | 600/436 |
| 2005/0099330 | A1 * | 5/2005 | Hausner et al. ............... | 342/22 |
| 2005/0230604 | A1 * | 10/2005 | Rowe et al. ................. | 250/221 |
| 2005/0232459 | A1 * | 10/2005 | Rowe et al. ................. | 382/100 |
| 2006/0273255 | A1 * | 12/2006 | Volkov et al. ........... | 250/336.1 |
| 2007/0052576 | A1 * | 3/2007 | Hausner et al. ............... | 342/22 |
| 2007/0188370 | A1 * | 8/2007 | Coward et al. ............... | 342/22 |
| 2007/0194976 | A1 * | 8/2007 | Reed et al. .................. | 342/22 |
| 2007/0205936 | A1 * | 9/2007 | McMakin et al. ............ | 342/22 |

OTHER PUBLICATIONS

Reed, J., "Signal Processing and Waveform Generation in the Side Zone Automotive Radar", Proc. 17th DASC Conf., Bellevue WA, Oct. 31, 1998.

* cited by examiner

*Primary Examiner*—Thomas H. Tarcza
*Assistant Examiner*—Shelley Chen
(74) *Attorney, Agent, or Firm*—Mark A. Navarre

(57) ABSTRACT

A linear FM pulse radar with Doppler processing of co-polarized and cross-polarized radar return signals isolates the target echo signal content associated with a moving pedestrian to provide high quality target echo data for standoff HCE detection based on polarimetric signature analysis. Baseband co-polarized and cross-polarized radar return signals are repeatedly and coherently integrated across numerous successive radar return pulses to create co-polarized and cross-polarized range vs. velocity (Doppler) data maps. The co-polarized data map is used to identify a moving pedestrian, and co-polarized and cross-polarized data subsets corresponding to the identified pedestrian are extracted and subjected to polarization signature analysis to determine if the pedestrian is bearing explosive devices. Low pass filtering of the of the baseband co-polarized and cross-polarized radar return signals prior to integration provides range aliasing to reject signal content associated with objects beyond the unambiguous range of the radar apparatus.

15 Claims, 4 Drawing Sheets

US 7,304,603 B2

RADAR APPARATUS AND PROCESSING METHOD FOR DETECTING HUMAN CARRIED EXPLOSIVE DEVICES

TECHNICAL FIELD

The present invention relates to the detection of human carried explosive (HCE) devices by processing polarized radar reflections, and more particularly to a radar apparatus and processing method that provide enhanced HCE detection.

BACKGROUND OF THE INVENTION

Various counter-terrorism systems have been devised for detecting the presence of HCE devices that are concealed from view, by the clothing of a suicide bomber, for example. A particularly effective system, described in the U.S. Pat. No. 6,967,612 to Gorman et al., develops radar range profiles of potential targets within a field of regard and analyzes diversely polarized radar signal reflections for each target to detect polarization signatures that are characteristic of a person that is carrying explosive devices. Radar or video camera data is processed to identify or track one or more targets within the field of regard, and a servo mechanism aims the radar at specified targets for data acquisition and polarimetric signature analysis.

SUMMARY OF THE INVENTION

The present invention is directed to a radar apparatus and processing method for use in HCE detection based on polarimetric signature analysis. Doppler processing of orthogonally polarized radar return signals isolates the radar signal content associated with a moving pedestrian in the radar field of view to provide high quality target echo data for polarimetric signature analysis. The Doppler processing produces co-polarized and cross-polarized range vs. velocity (Doppler) data maps, and target echo data corresponding to the moving pedestrian is identified. Co-polarized and cross-polarized data subsets associated with the range and velocity coordinates of the identified moving pedestrian are extracted and subjected to polarization signature analysis to determine if the pedestrian is bearing explosive devices. Low pass filtering of the of the co-polarized and cross-polarized radar return signals prior to Doppler processing provides range aliasing to reject signal content associated with objects beyond the unambiguous range of the radar apparatus.

DESCRIPTION OF THE PREFERRED EMBODIMENT

As indicated above, the present invention is directed to a radar apparatus and processing method for use in a standoff HCE detection system of the type disclosed in the aforementioned U.S. Pat. No. 6,967,612 to Gorman et al., incorporated herein by reference. As described by Gorman et al., the target echo response to a polarized radar transmission is received in the form of a co-polarized response and a cross-polarized response, and the presence of HCE devices in the radar field of view is detected based on the relative magnitudes of the co-polarized and cross-polarized responses. In a preferred implementation, the polarimetric signature analysis involves forming a ratio of the polarized responses and comparing the ratio with reference values characteristic of HCE devices. The radar transmits a narrow beam, and an aiming apparatus points the beam at a given object-of-interest such as a pedestrian (i.e., a potential suicide bomber) moving toward a protected region. However, even an accurately aimed narrow radar beam is likely to illuminate closely spaced objects in addition to the object-of-interest when the system is operated in a real-world environment. Such "not-of-interest" objects may include, for example, other moving or stationary pedestrians, parked or moving cars, trees, buildings, etc.

Figure 1:
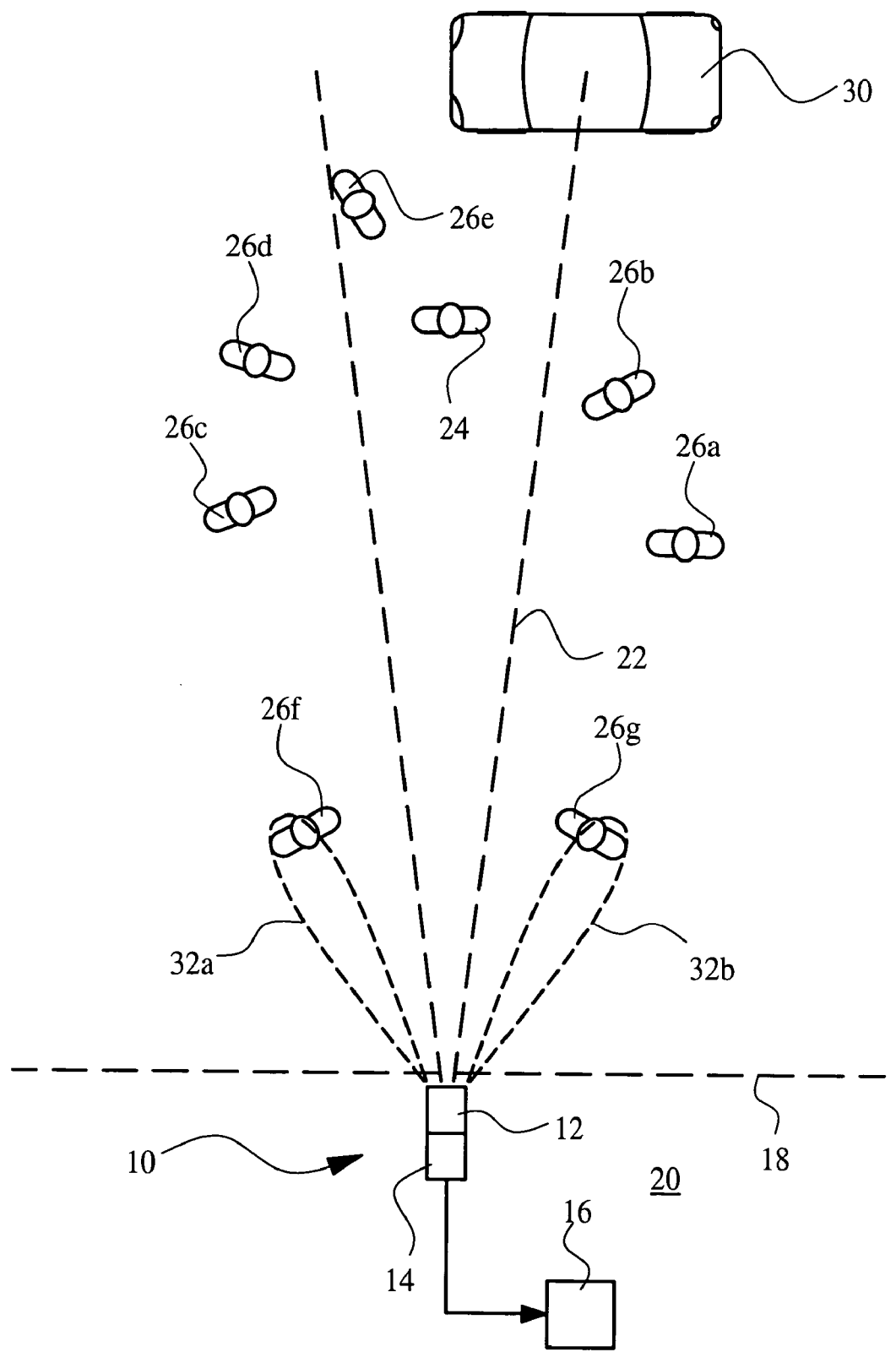
FIG. 1 is a diagram of a real-world scenario in which the radar apparatus of the present invention is utilized to detect HCE devices.

FIG. 1 illustrates a representative real-world scenario in which a HCE detection system is used. The reference numeral 10 generally designates a HCE detection system 10 including a radar sensor 12, a digital signal processor (DSP) 14 and a user interface device 16. The HCE detection system 10 is positioned at or near the perimeter 18 of a protected region 20, and an aiming apparatus (not shown) points the main beam 22 of radar sensor 12 at a selected pedestrian 24. The field of regard, which may include the entire scene forward of perimeter 18, also includes various not-of-interest objects such as other pedestrians 26a, 26b, 26c, 26d, 26e, 26f, 26g (moving or stationary), a post or tree 28, and a parked car 30. Certain of these not-of-interest objects are at least partially illuminated by the main beam 22; in FIG. 1, the main beam illuminates the pedestrian 26e, the post/tree 28 and the parked car 30 in addition to the object-of-interest (i.e., pedestrian 24). Moreover, the transmit signal of radar sensor 12 will typically include side-lobes 32a, 32b in addition to the main beam 22, and these side-lobes can illuminate various not-of-interest objects such as the pedestrians 26f, 26g. Due to the radar illumination of not-of-interest objects, the co-polarized and cross-polarized responses processed by DSP 14 will include not-of-interest signal content (i.e., clutter) in addition to the object-of-interest signal content. Since such clutter can distort or disguise the polarimetric signature of the object-of-interest (pedestrian 24), it is important to maximize the signal-to-clutter power ratio (SCR) of the HCE system 10. For similar reasons, the radar sensor 12 must have a reasonably high signal-to-noise ratio (SNR) to produce high quality polarimetric signatures, while rejecting signal content associated with distant not-of-interest objects having large radar cross-section, such as the car 30 in FIG. 1 or a building.

The present invention addresses the performance issues outlined above, and produces high quality polarimetric signatures for accurate and reliable standoff HCE detection even in cluttered and highly variable environments. The invention utilizes a pulse-Doppler radar apparatus to acquire target echo data uniquely associated with moving objects, since movement (particularly movement toward a protected region 20) is strongly characteristic of a suicide bomber.

With appropriate signal processing, this automatically rejects clutter associated with stationary objects within the radar field of view, as well as objects moving at different velocities than the object-of-interest. The SNR is optimized for a given transmitter output power level by utilizing a linear frequency-modulated transmit waveform with relatively long pulse-widths, and coherently integrating range bin data in the target echo signal across numerous pulses. Additionally, hardware and DSP filtering are utilized to squelch signals associated with not-of-interest objects beyond the radar's unambiguous range and velocity limits.

Figure 2:
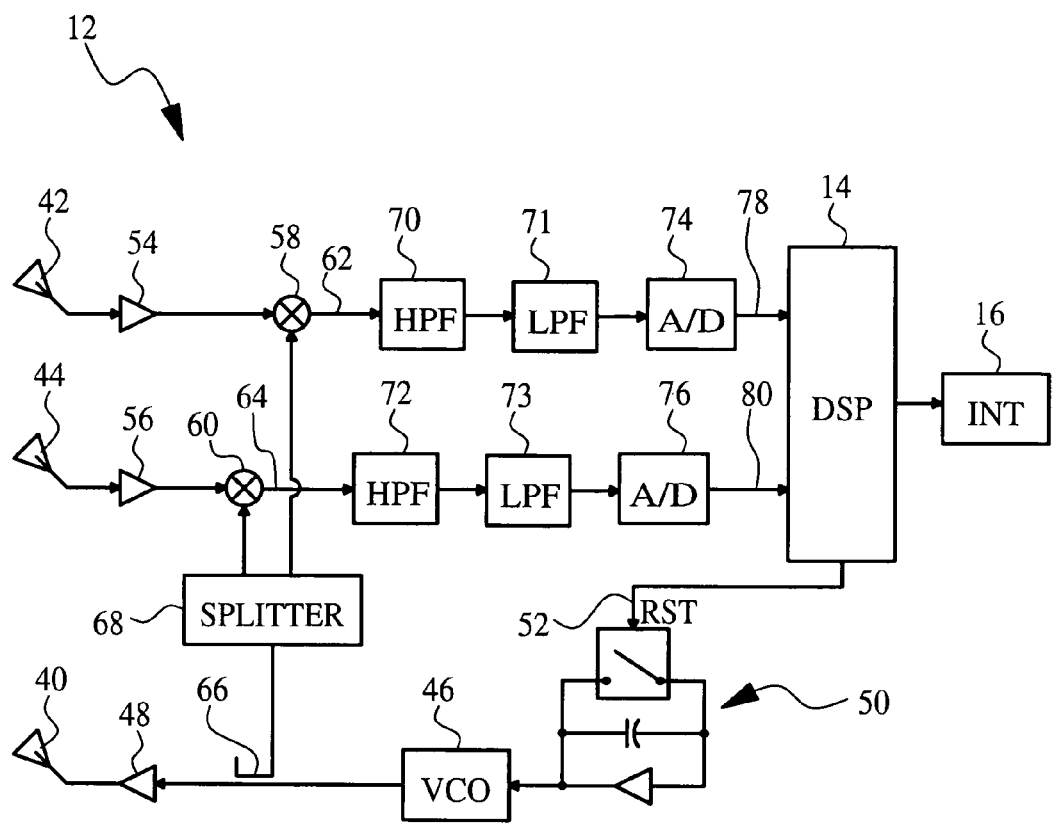
FIG. 2 is a block diagram of a linear FM pulse radar architecture, including a digital signal processor (DSP) for processing co-polarized and cross-polarized target echo signals according to the present invention.

Referring to FIG. 2, the radar apparatus 12 according to the present invention may be generally described as a pulse or chirp Doppler radar with a polarized transmit antenna 40, a co-polarized receive antenna 42 and a cross-polarized (i.e., orthogonally polarized) receive antenna 44. The co-polarized and cross-polarized return signals are supplied to DSP 14 for target identification and tracking, and polarimetric analysis, and the HCE detection results are outputted to interface device 16.

Figure 3:
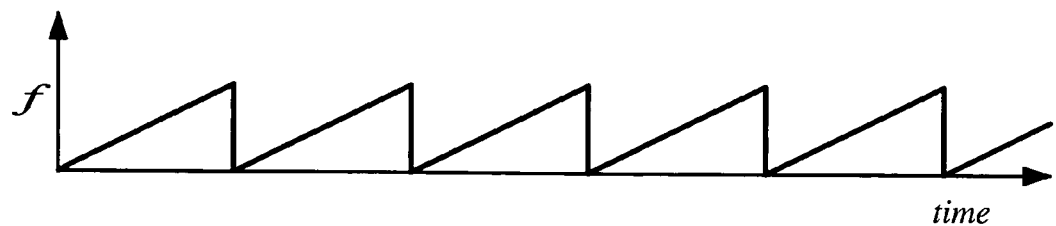
FIG. 3 graphically depicts a FM pattern for the radar transmit signal of FIG. 2.

The transmit waveform is produced by voltage-controlled oscillator (VCO) 46 and supplied to transmit antenna 40 via amplifier 48. Signal generator 50 produces the control voltage for VCO 46, a linear ramp that is periodically reset by DSP 14 via line 52. This produces a linear frequency modulation in VCO 46 as graphically depicted in FIG. 3. By way of example, the modulation waveform of FIG. 3 may have a pulse-width of 10-2000 μsec, and the radiated transmit waveform may have a frequency bandwidth of 2-10,000 MHz. Although not illustrated in FIG. 3, there is a very brief blanking interval (such as 1-5 μsec) between pulses to allow substantial decay of reset-related transients. The long duration transmit pulses and near 100% duty cycle provide excellent range resolution even at short ranges and maximize sensitivity for a given transmitter output power level.

The co-polarized and cross-polarized target echo signals respectively received by antennas 42 and 44 are passed through amplifiers 54 and 56, and then mixed with replicas of the transmit waveform in mixers 58 and 60 to produce co-polarized and cross-polarized baseband signals on lines 62 and 64. In the diagram of FIG. 2, the transmit waveform replica is obtained by a pickup device 66 and duplicated by splitter 68. Since the radar return signals are mixed with replicas of the transmit signal, the baseband signals on lines 62 and 64 exhibit a frequency that is proportional to the delay of the respective target echo signals. And as the transmitted signal is sweeping in frequency the baseband signals are conditioned by high-pass filters (HPF) 70 and 72 and low-pass filters 71 and 73. The filtered baseband signals are then digitized by A/D converters 74 and 76, and supplied to DSP 14 via lines 78 and 80. If desired, splitter 68 can be configured to delay the replica waveforms relative to the transmit waveform to provide extended range coverage. The high-pass filters 70 and 72 primarily operate to reject low frequency (below 50 kHz, for example) signal content due to receiver noise and mixer bias, and may alternatively be implemented as band-pass filters. Additionally, the high-pass filtering tends to attenuate short-range target echo signals, thereby normalizing the signal response to target range. The purpose of low-pass filters 71 and 73 is discussed below.

Figure 4:
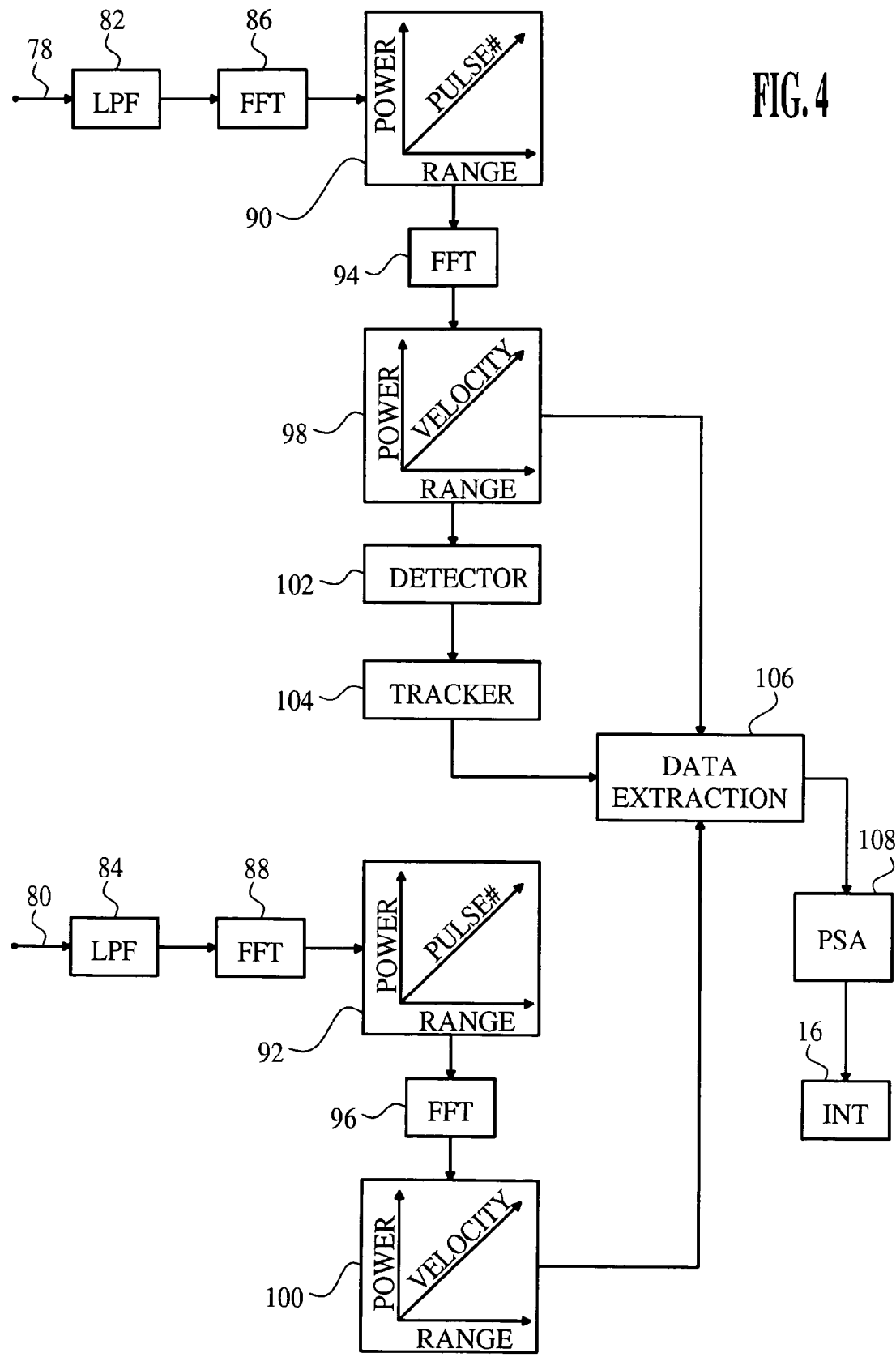
FIG. 4 is a block diagram describing the functionality of the DSP of FIG. 2.

The block diagram of FIG. 4 represents the functionality of DSP 14 with respect to the present invention. The digital co-polarized and cross-polarized baseband radar return signal inputs on lines 78 and 80 are processed by the blocks 82-108 to form an HCE detection decision, and the decision is outputted to the interface device 16 per FIGS. 1-2.

Initially, the co-polarized and cross-polarized baseband signal inputs are filtered by low-pass filters 82 and 84 for rejection of signal content associated with distant not-of-interest objects. This is important, especially in the case of large distant objects such as buildings and vehicles, because such objects typically have a much higher radar cross-section (RCS) than the usual object-of-interest, a pedestrian. If not rejected, the target echo signals from such distant objects (i.e., objects beyond the unambiguous range of the radar sensor 12) will "fold into" the unambiguous range and distort target echo signals associated with objects-of-interest. According to the present invention, the distant target echo returns are initially attenuated to some degree by analog low-pass filters 71 and 73. The distant target echo signals are further attenuated by over-sampling the baseband signals at A/D blocks 74 and 76 in conjunction with low-pass filtering of the digitized baseband signals at blocks 82 and 84. The high frequency roll-off of the low-pass filters 71 and 73 complements the low-pass function of blocks 82 and 84. The A/D over-sampling enhances the performance of digital filters 82 and 84, and also extends the radar's unambiguous range to enhance the rejection capabilities of the analog filter blocks 71 and 73.

The filtered co-polarized and cross-polarized baseband signals are then subjected to Fast-Fourier Transform (FFT) analysis as indicated by blocks 86 and 88. For each target echo pulse in the co-polarized and cross-polarized baseband signals, the FFT blocks 86 and 88 generate range profiles, each profile comprising a sequence of data samples corresponding to signal strength in successive and contiguous range bins projected onto the illuminated field of view. The range profile data generated by FFT block 86 is stored in data table or map 90, and the range profile data generated by FFT 88 is similarly stored in data table 92. In the illustration, each data table row stores range profile data for a given target echo pulse, and the tables 90 and 92 are filled with range profile data as the FFT blocks 86 and 88 process a succession of target echo pulses.

When the data tables 90 and 92 are filled, the co-polarized target echo response for any given range can be obtained by reading the range profile data in the corresponding column of table 90, and the cross-polarized response can be similarly obtained from table 92. The FFT 94 integrates the co-polarized target echo response for each range bin of table 90 to measure pulse-to-pulse phase (Doppler) shifts of targets therein. The FFT 96 similarly analyzes the cross-polarized target echo responses stored in table 92. Since target movement toward the radar sensor 12 (i.e., targets having a radial velocity) produces a nearly constant change in phase shift between successive pulses, the FFT integration of blocks 94 and 96 acts as a matched filter for moving targets with constant radial velocity. The integration interval of FFT blocks 94 and 96 is relatively long (on the order of 50 milliseconds) to maximize the radar's SNR for a given transmitter output power level, but is nevertheless short in relation to a pedestrian's capacity to accelerate. Accordingly, the velocity of the object-of-interest (i.e., pedestrian 24 of FIG. 1) will be constant over the integration interval, and the integration of FFT blocks 94 and 96 effectively constitutes a matched filter for moving pedestrians in the radar field of view. Consequently, signal clutter associated with stationary objects and objects moving at different velocities than the object-of-interest within the radar field of view are automatically rejected, substantially enhancing the radar's SCR. This is demonstrated in the real-world example of FIG. 5, as described below.

The velocity (Doppler) signal strength (amplitude) data generated by FFT 94 for each range bin of table 90 is stored in table 98, and the data generated by FFT 96 is similarly stored in data table 100. After each of the range bins of tables 90 and 92 have been integrated, and the data stored in tables 98 and 100, respectively, the range vs. velocity data is ready for analysis.

Figure 5:
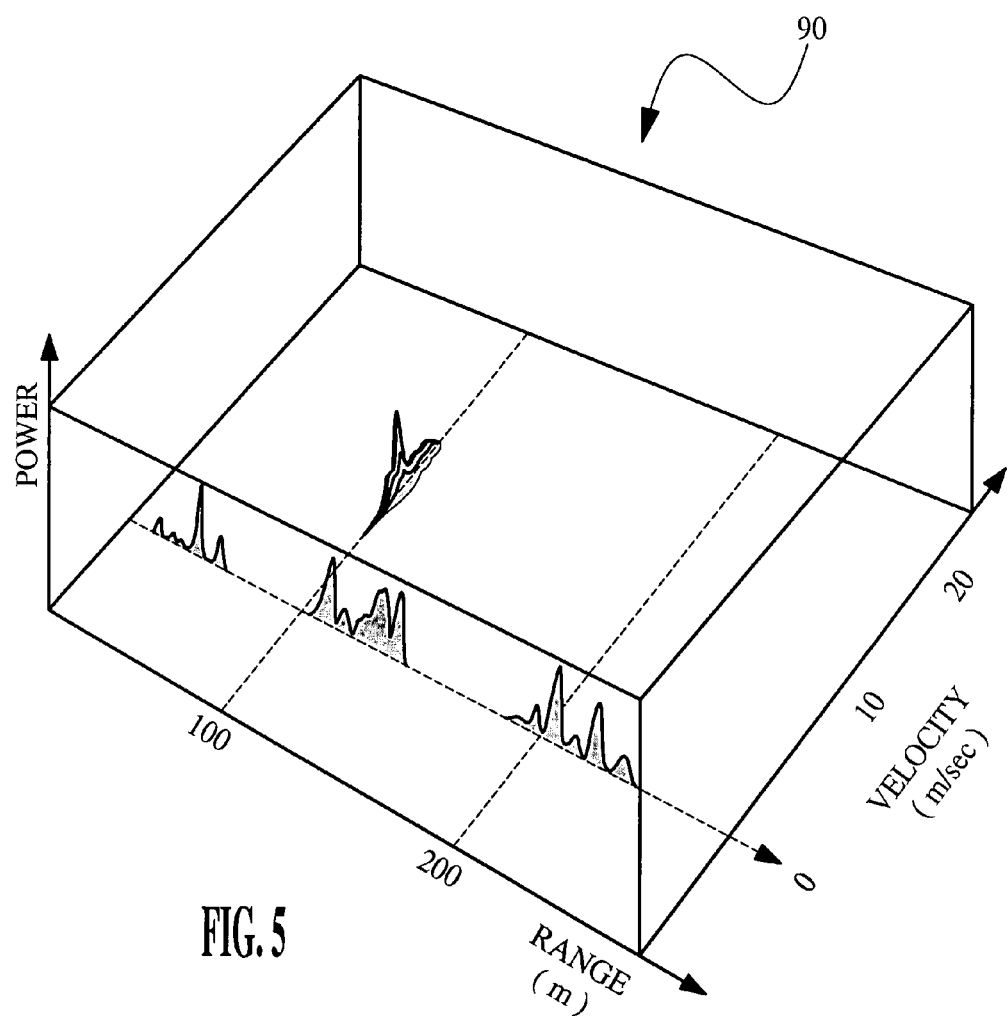
FIG. 5 is a representation of range vs. velocity (Doppler) data collected by the DSP of FIG. 2 in the case of a pedestrian moving toward the radar apparatus.

FIG. 5 is a graphical representation of the co-polarized range vs. velocity data stored in table 98 for a real-world scenario such as depicted in FIG. 1 where a pedestrian 24 is walking toward the radar sensor 12 at a range of approximately 100 m. In this case, the not-of-interest objects are stationary or have no substantial velocity toward the radar sensor 12, and produce a series of echoes in various range bins, but at substantially zero velocity. Such echoes are disregarded as clutter. In contrast, the object-of-interest 24 produces a significant non-zero velocity return in the appropriate range bin, allowing clear separation of the target echo signal content associated with the target of interest.

Returning to FIG. 4, the blocks 102-106 process the co-polarized range vs. velocity data stored in table 98 over an extended period of time such as 0.5-10 seconds, forming a data sequence for the object-of-interest. Although the cross-polarized data stored in table 100 could be similarly processed, the co-polarization data is preferred for detection and tracking since it is typically significantly higher in power than the corresponding cross-polarization data. Since there may be several objects-of-interest in a real-world field-of-regard, the blocks 102-106 are also designed to separately group data sequences for each such target-of-interest. Each time the table 98 is filled with range vs. velocity data, block 102 (detector) scans table 98 and locates the co-polarized response for a target-of-interest and produces (range, velocity) coordinates where each target response is located. The output of detector block 102 is thus a list of (range, velocity) coordinates, one set of coordinates for each detected target. The block 104 (tracker) tracks the range and velocity coordinates of each target-of-interest over time by assigning the vector outputs of block 102 to a target-specific historical data tracks. Each time the block 104 assigns a vector output to a historical data track, the block 106 (data extraction) fetches response data subsets from both the co-polarized data table 98 and the cross-polarized data table 100 for polarimetric signature analysis. The block 106 stores a matrix of extracted co-polarized and cross-polarized data for each target-of-interest, and supplies the data to block 108 (PSA) for polarimetric signature analysis as described in the aforementioned U.S. Pat. No. 6,967,612 to Gorman et al. As described in that patent, the block 108 maintains a historical record of polarimetric ratios for each target-of-interest and decides if a HCE device is present. The outcome of the HCE decision is then supplied to the interface device 16 as mentioned above.

In summary, the present invention enhances the utility of HCE device standoff detection using polarimetric signature analysis, particularly as applied to moving pedestrians. While the invention has been described with respect to the a illustrated embodiment, it will be recognized that numerous modifications and variations in addition to those mentioned above will occur to those skilled in the art. In general, the radar sensor 12 must be configured to transmit polarized radar energy and receive reflected radar energy in the form of co-polarized and cross-polarized target echo signals that can be isolated according to the range of the illuminated objects. As will be appreciated by those skilled in the art, this objective can be achieved with various radar techniques including, for example, narrow pulse transmissions, non-linear frequency modulation, phase or amplitude modulation, or modulation by noise or pseudo-random noise sequences. Similarly, VCO 46 may be replaced with a fully synthesized signal source, and the Doppler processing can be mechanized with a bank of analog filters in lieu of the described digital mechanization. Likewise, various transmit and receive antenna configurations and polarization combinations may be utilized, as described for example in the aforementioned U.S. Pat. No. 6,967,612 to Gorman et al. Accordingly, it is intended that the invention not be limited to the disclosed embodiment, but that it have the full scope permitted by the language of the following claims.

The invention claimed is:

1. A standoff detection method for human carried explosive (HCE) devices, comprising the steps of:
    transmitting a beam of polarized radar energy that illuminates a moving pedestrian-of-interest;
    receiving return radar energy in a manner to produce co-polarized and cross-polarized target echo signals that are isolated in target range;
    doppler processing said target echo signals to map co-polarized and cross-polarized target echo responses as a function of target range and target velocity;
    identifying portions of the mapped co-polarized and cross-polarized target echo responses that correspond to the moving pedestrian-of-interest; and
    evaluating the identified portions of the mapped co-polarized and cross-polarized target echo responses to determine if the pedestrian-of-interest is carrying an HCE device.

2. The standoff detection method of claim 1, including the steps of:
    determining target range and target velocity coordinates of the moving pedestrian-of-interest;
    extracting mapped co-polarized and cross-polarized target responses corresponding to the determined target range and target velocity coordinates; and
    performing a polarimetric signature analysis of the extracted co-polarized and cross-polarized target responses to determine if the pedestrian-of-interest is carrying an HCE device.

3. The standoff detection method of claim 2, including the steps of:
    extracting matrices of the mapped co-polarized and cross-polarized target responses based on the determined target range and target velocity coordinates; and
    performing a polarimetric signature analysis of the extracted matrices to determine if the pedestrian-of-interest is carrying an HCE device.

4. The standoff detection method of claim 2, including the step of:
    evaluating the mapped co-polarized target responses to determine the target range and target velocity coordinates of the moving pedestrian-of-interest.

5. The standoff detection method of claim 1, including the steps of:
    illuminating the moving pedestrian-of-interest with a beam of polarized radar energy based on a linear frequency modulated transmit signal;
    separately receiving co-polarized and cross-polarized return radar energy signals; and
    mixing the received co-polarized and cross-polarized return radar energy signals with replicas of said linear frequency modulated transmit signal to form co-polarized and cross-polarized target echo signals that vary in frequency relative to range.

6. The standoff detection method of claim 1, including the steps of:
   processing the co-polarized and cross-polarized target echo signals to produce target echo signal profiles that differ in target range; and
   doppler processing the target echo signal profile for each target range to map the co-polarized and cross-polarized target echo responses as a function of both target range and target velocity.

7. The standoff detection method of claim 6, including the steps of:
   frequency modulating the transmitted beam of radar energy in pulses; and
   analyzing the co-polarized and cross-polarized target echo signals by target range over a succession of return radar energy pulses to generate said target echo signal profiles.

8. The standoff detection method of claim 1, including the step of:
   low pass filtering said co-polarized and cross-polarized target echo signals prior to Doppler processing to reject target echo signals corresponding to illuminated objects beyond an unambiguous range of said beam of radar energy.

9. Apparatus for standoff detection of human carried explosive (HCE) devices, comprising the steps of:
   a radar transmitter for emitting a beam of polarized radar energy that illuminates a moving pedestrian-of-interest;
   a radar receiver for receiving reflected radar energy and producing co-polarized and cross-polarized target echo signals that are isolated in target range; and
   a signal processor for doppler processing said co-polarized and cross-polarized target echo signals to map co-polarized and cross-polarized target echo responses as a function of target range and target velocity, for identifying portions of the mapped co-polarized and cross-polarized target echo responses that correspond to the moving pedestrian-of-interest, and for evaluating the identified portions of the mapped co-polarized and cross-polarized target echo responses to determine if the pedestrian-of-interest is carrying an HCE device.

10. The apparatus of claim 9, where said signal processor determines target range and target velocity coordinates of the moving pedestrian-of-interest, extracts mapped co-polarized and cross-polarized target responses corresponding to said target range and target velocity coordinates, and evaluates a polarimetric signature of the extracted target responses to determine if the pedestrian-of-interest is carrying an HCE device.

11. The apparatus of claim 10, where said signal processor evaluates the mapped co-polarized target responses to determine said target range and target velocity coordinates.

12. The apparatus of claim 9, where:
   said radar transmitter emits said radar energy in accordance with a linear frequency modulated transmit signal; and
   said radar receiver includes means for separately receiving co-polarized and cross-polarized signal versions of the reflected radar energy, and means for mixing said co-polarized and cross-polarized signal versions with replicas of said linear frequency modulated transmit signal to form co-polarized and cross-polarized target echo signals that vary in frequency relative to target range.

13. The apparatus of claim 9, further comprising:
   filter means for low pass filtering said co-polarized and cross-polarized target echo signals prior to Doppler processing to reject target echo signals corresponding to illuminated objects beyond an unambiguous range of said beam of radar energy.

14. The apparatus of claim 9, where said signal processor comprises:
   range processing means for processing the co-polarized and cross-polarized target echo signals to generate a series of co-polarized and cross-polarized target echo signal profiles that differ in target range; and
   Doppler processing means for Doppler processing target echo signal profiles for each target range to map the co-polarized and cross-polarized target echo responses as a function of target range and target velocity.

15. The apparatus of claim 14, where:
   said radar transmitter emits said radar energy in accordance with a transmit signal comprising linear frequency modulated pulses; and
   said range processing means processes the co-polarized and cross-polarized target echo signals over a succession of reflected radar energy pulses to generate said target echo signal profiles.

* * * * *